United States Patent
Zarudiansky (10) Patent No.: US 6,173,617 B1
(45) Date of Patent: Jan. 16, 2001

(54) CELL FOR CONVERTING DIFFERENTIAL PRESSURE INTO AN ELECTRIC SIGNAL

(75) Inventor: Alain Zarudiansky, Vélizy (FR)

(73) Assignee: Schlumberger Industries, S.A., Montrouge (FR)

(*) Notice: Under 35 U.S.C. 154(b), the term of this patent shall be extended for 0 days.

(21) Appl. No.: 09/280,894

(22) Filed: Mar. 29, 1999

Related U.S. Application Data (63) Continuation of application No. PCT/FR97/01794, filed on Oct. 8, 1997, now abandoned.

(51) Int. Cl.$^7$ .............................. G01F 1/20; G01F 13/02
(52) U.S. Cl. ..................... 73/861.19; 73/715; 73/716
(58) Field of Search ................ 73/861.19, 707, 73/708, 715, 716, 717, 718, 719, 720, 721, 756

(56) References Cited

U.S. PATENT DOCUMENTS

| | | | |
|---|---|---|---|
| 3,895,524 | * 7/1975 | Jurovsky | 73/716 |
| 4,878,385 | * 11/1989 | Lloyd | 73/720 |
| 5,623,101 | * 4/1997 | Freitag | 73/708 |
| 5,969,258 | * 10/1999 | Gerst et al. | 73/708 |

* cited by examiner

Primary Examiner—Harshad Patel
(74) Attorney, Agent, or Firm—Leonard W. Pojunas (57) ABSTRACT

A cell for converting a differential pressure into an electric signal, which comprises two chambers and a sensor. The two chambers are filled with an incompressible fluid and each are closed by a respective membrane suitable for deforming under the action of an external pressure. The chambers are separated from each other by a rigid wall. The sensor associated with the wall and responsive to the pressure difference exerted across the wall, delivers an electric signal in response thereto. At least one passage is formed between the two chambers and possesses appropriate dimensions firstly for at least attenuating a parasitic pressure difference existing across the wall at a frequency that is low or zero, and secondly for allowing the sensor to detect the pressure difference exerted across the wall at higher frequencies.

5 Claims, 4 Drawing Sheets

Fig. 7

CELL FOR CONVERTING DIFFERENTIAL PRESSURE INTO AN ELECTRIC SIGNAL

This is a continuation of international application (by PCT/FR97/01794, filed Oct. 8, 1997, which designated the United States and is now abandoned.

FIELD OF THE INVENTION

The present invention relates to a cell for converting a differential pressure into an electric signal, the cell comprising:

two chambers filled with an incompressible fluid and each closed by a respective membrane suitable for deforming under the action of an external pressure, the chambers being separated from each other by a rigid wall; and a sensor associated with said wall and responsive to the pressure difference exerted across the wall, delivering an electric signal in response thereto.

BACKGROUND OF THE INVENTION

Such cells are used in many applications, and in particular in fluidic oscillator flow meters.

A flow meter of that type is symmetrical about a longitudinal plane, and the flow of fluid therein is transformed into a fluid jet which oscillates in a "oscillation" chamber transversely relative to said plane at an oscillation frequency that is proportional to the flow rate of the fluid.

The variations in differential pressure which appear between two positions taken up in alternation by the fluid jet symmetrically about the above-defined longitudinal plane are converted by a cell into an electric signal representative of their frequency of oscillation.

Associated electronics transform the electric signal into a squarewave that can be used to determine the flow rate of fluid in the oscillator, and also the volume that has passed therethrough.

It is thus possible to provide a channel connecting two pressure takeoff points corresponding respectively to two symmetrical positions of the fluid jet, and to place a converter cell in the channel between the two pressure takeoff points corresponding to the two extreme symmetrical positions of the fluid jet in order to obtain the electric signal representative of the differential pressure.

The converter cell has two chambers filled with an incompressible fluid such as oil and separated by a rigid wall, each of the chambers also being defined by a membrane remote from the wall.

Each of the membranes is in contact with the fluid of the channel and is subjected directly to pressure by said fluid. As a result, both membranes are continuously subjected to the action of different pressures that vary in alternating manner depending on the oscillation of the jet. These pressures are transmitted to the separating wall via the incompressible fluid present in the chambers.

The wall separating the chambers carries a differential pressure sensor which is in communication with each of the chambers so as to be exposed to the pressures obtaining therein.

By way of example, the sensor may be the sensor described in document CH 680 392 which comprises a fixed central element between two deformable elements each of which is subjected to the pressure obtaining in the corresponding chamber.

Two parallel cavities in communication are formed respectively between each deformable element and the central element to enable the sensor to operate. Each couple comprising the central element and one of the deformable elements is provided with respective electrodes disposed facing each other and forming a capacitance which varies in different manner when different pressures are applied to each of the deformable elements.

When the chambers are filled with the incompressible fluid and are then sealed, it is highly likely that the filling and sealing operations are not identical in both chambers, so there is a risk of generating a pressure difference between the chambers.

The pressure difference can be further increased if the volumes of the chambers are not absolutely identical and the membranes do not have exactly the same stiffness.

Because of this "parasitic" pressure difference, the deformable element(s) of the sensor is/are subject to residual deformation giving rise automatically to error in subsequent measurements.

That phenomenon is made worse when the temperature of the medium in which the converter cell is to be found increases at a frequency that is low or zero (a non-repetitive phenomenon) since, under such circumstances, the volumes of the chambers increase differently from one chamber to the other, thereby giving rise to greater residual deformation of the deformable element(s) and thus inducing even greater error before any measurement is performed.

To avoid the above, special care needs to be taken during manufacture of converter cells, thereby making the manufacturing process more complex and increasing the cost thereof.

OBJECT AND BRIEF SUMMARY OF THE INVENTION

It would therefore be advantageous to design a converter cell which is simpler to manufacture than the prior art cell and which is therefore cheaper, while also being insensitive to problems of temperature drift.

The present invention thus provides a cell for converting a differential pressure into an electric signal, the cell comprising:

two chambers filled with an incompressible fluid and each closed by a respective membrane suitable for deforming under the action of an external pressure, the chambers being separated from each other by a rigid wall; and a sensor associated with said wall and responsive to the pressure difference exerted across the wall, delivering an electric signal in response thereto;

wherein at least one passage is formed between the two chambers and possesses appropriate dimensions firstly for at least attenuating a parasitic pressure difference existing across the wall at a frequency that is low or zero, and secondly for allowing said sensor to detect the pressure difference exerted across the wall at higher frequencies.

In the absence-of the invention, the parasitic pressure differences that arise on either side of the wall separating the chambers at a frequency below frequencies in the working range detected by the differential pressure sensor nevertheless act on said sensor.

The passage of appropriate dimensions serves, at low frequencies to attenuate and at very low frequencies to eliminate, such parasitic pressure differences by allowing the incompressible fluid to move through said passage, making it possible, in quasi-static manner, to bring to pressure in the chambers into equilibrium.

The passage acts as a fluidic filter at the frequencies of the parasitic differential pressures.

The dimensions of the passage depend on parameters such as the viscosity of the fluid, the "cutoff" frequency below which parasitic pressure differences are considerably attenuated at the sensor, and the dimensions at the materials used for the membranes, so the dimensions need to be determined for each application as a function of the working frequency range and of the frequencies of parasitic pressure differences.

Above the low frequency of the working frequency range, the passage must not filter out differential pressure between the chambers on either side of the separator wall, since that would impede operation of the sensor in said frequency range.

In an embodiment of the invention, the passage of appropriate dimensions is formed in the wall separating the chambers.

In another embodiment, an opening is formed through the wall separating the chambers and having dimensions that are large relative to the dimensions appropriate for the passage, and said passage is formed in an add-on piece applied to said separator wall so that the passage and the opening are in communication with each other.

In yet another embodiment of the invention, the passage of appropriate dimensions is implemented in the form of a communication channel bypassing the chamber separator wall.

According to a characteristic of the invention, the add-on piece is substantially cylindrical in shape.

BRIEF DESCRIPTION OF THE DRAWINGS

Other characteristics and advantages appear from the following description given purely by way of non-limiting example, and made with reference to the accompanying drawings, in which.

MORE DETAILED DESCRIPTION

The cell of the invention for converting differential pressure into an electric signal is particularly suitable for use in fluidic oscillator flow meters.

Figure 1:
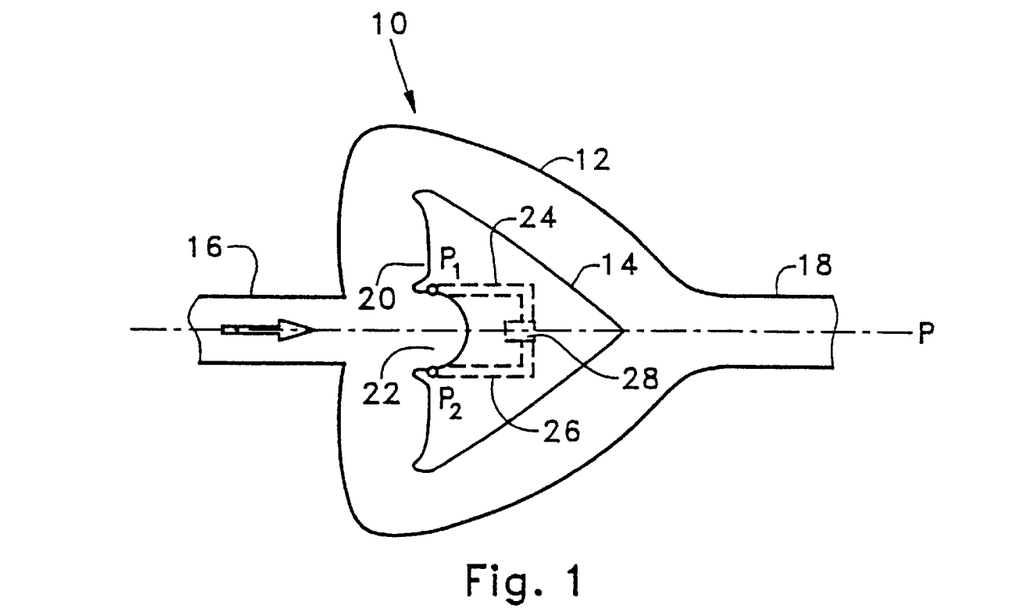
FIG. 1 is a diagrammatic longitudinal section view showing the location within a fluidic oscillator of known type of a cell of the invention for converting differential pressure into an electric signal.

As shown in FIG. 1, a known type of fluidic oscillator, referenced 10, comprises an enclosure 12 in which an obstacle 14 is located, together with a fluid flow feed 16 and a fluid flow drain 18 both in alignment on the longitudinal plane of symmetry P of the fluidic oscillator.

The fluid feed is implemented in the form of a slot 16 that serves to generate a two-dimensional fluid jet which encounters the obstacle 14 situated facing said slot 16 inside the enclosure 12. The obstacle 14 includes a front wall 20 in which a cavity 22 is formed facing the slot 16 and receiving the impact of the fluid jet coming therefrom.

Due to natural instabilities, the jet of fluid coming from the slot 16 sweeps the walls of the cavity 22 and occupies two extreme positions situated symmetrically on either side of the longitudinal plane of symmetry P of the fluidic oscillator. The extreme positions of the fluid jet are referenced P1 and P2 and are connected via respective channels 24 and 26 (shown in dashed lines in FIG. 1) to a converter cell 28 of the invention.

The cell 28 can be mounted above or below the obstacle 14 or indeed inside it if its size makes that possible.

Figure 2:
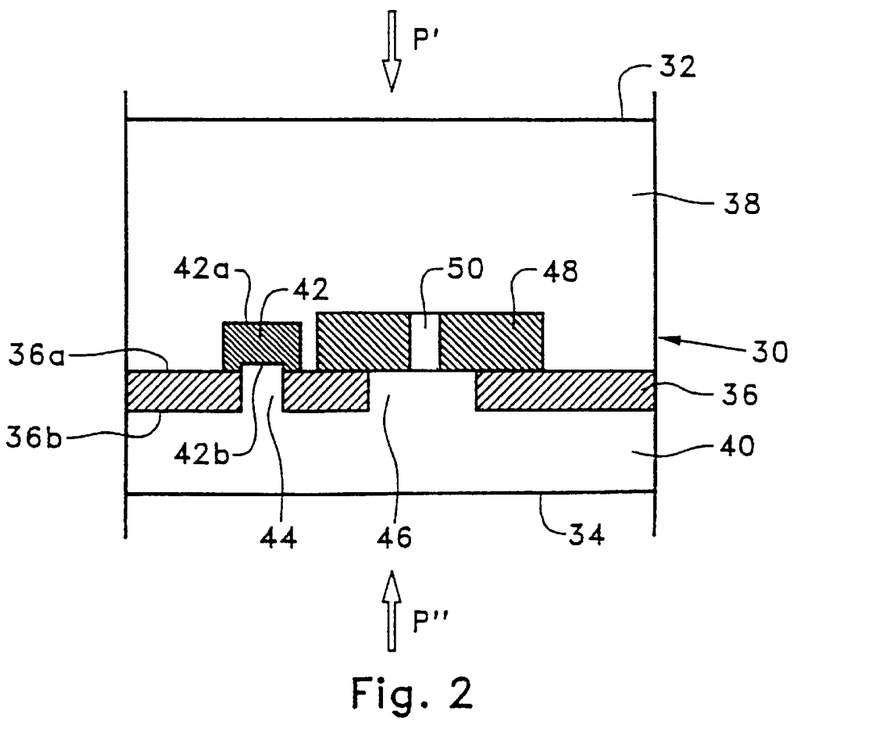
FIG. 2 is a diagrammatic section view of a converter cell constituting a first embodiment of the invention.

In the embodiment of the invention shown in FIG. 2, the converter cell is cylindrical in shape, comprising a cylindrical peripheral wall 30 and two opposite membranes 32 and 34, e.g. made of steel, and situated at the two ends of said cylinder, thereby closing the cylinder. Each of the membranes 32 and 34 is in contact both with the inside of the cell and with the fluid situated in the corresponding channel 24 or 26, so as to be subject to the pressure coming from the jet of fluid situated in the corresponding position P1, P2.

A rigid wall 36, e.g. made of a material such as a alumina, subdivides the inside of the cell into two distinct chambers 38 and 40. The two chambers 38 and 40 are filled with an incompressible fluid such as oil, for example.

A differential pressure sensor 42, e.g. of the type described in document CH 680 392 or in document FR 2 701 564 is mounted on one of the faces 36a of the separator wall 36.

One of the faces 42a of the sensor 42 is in contact with the oil of the chamber 38 and the opposite face 42b of said sensor is in contact with the oil present in the other chamber 40 via an orifice 44 formed through the separator wall 36. Thus, when the fluid jet sweeps the cavity 22 (FIG. 1) and occupies the positions P1 and P2 in alternation, each of the membranes 32 and 34 receives a respective pressure P' and P" in alternation. The differential pressure between P1 and P2 is thus applied in alternating manner at an "oscillation" frequency to the converter cell of the invention, and the sensor 42 delivers an electric signal representative of the frequency of oscillation of the jet in response to the variations in said differential pressure which is transmitted thereto by the oil present in the chambers 38 and 40. The electronic means necessary for processing the signal delivered by the sensor in order to determine the fluid flow rate are not shown on the separator wall 36.

An opening 46, e.g. a circular opening, is formed through the separator wall 36.

A piece 48, e.g. a piece that is cylindrical in shape, is made of a material such as glass and is mounted facing the opening 46.

The radial size of the piece 48 is larger than that of the opening 46, and the piece is mounted in contact with the separator wall 36 at the periphery of the opening 46. This add-on piece 48 is mounted on the wall 36 by adhesive, for example, and in its center it has a passage 50 of a size that is small compared with the size of the opening 46. In order to simplify manufacture of the passage 50, it is cylindrical in shape.

The Applicant has observed that to determine the dimensions of the passage 50, it can be useful to make use of an electronic analogy. In this analogy, the pressure difference |P′−P″| exerted on the cell corresponds to a voltage, the fluid flow rate Q passing through the passage 50 corresponds to an electric current, the volume of oil displaced by deflection of each membrane 32, 34 per unit pressure corresponds to capacitance, written C, and the opposition of the passage 50 to the flow of oil corresponds to resistance, written R. Thus, the pressure difference written ΔP is expressed as follows using the conventional notation of imaginary rotation:

$$\Delta P = [R + 1/j(C/2)\omega]Q$$

where ω is angular frequency, i.e. ω=2πf.

If the pressure difference exerted identically on either side of the sensor 42 and the passage 50 is written $\Delta P_s$, then to determine the dimensions of the passage 50 it is necessary to determine the frequency at which the ratio $\Delta P_s/\Delta P$ is as close as possible in value to 1.

In practice, it can be assumed that the ratio $\Delta P_s/\Delta P$ is equal to 1−ϵ2, where ϵ/2 corresponds to acceptable error (e.g. 4%) at the frequency under consideration. This equation can be written:

$$R/\sqrt{R^2 + 1/(C/2)^2\omega^2} = 1 - \epsilon/2$$

and can be solved to find the following value for ϵ:

$$\epsilon = 4/R^2 C^2 \omega^2$$

The time constant τ of the filter is equal to RC/2, and the cutoff frequency fc of the filter is equal to the frequency at which the attenuation of the signal is $1/\sqrt{2}$ relative to the value of the signal in the working frequency range, i.e. 1/πRC.

Figure 3:
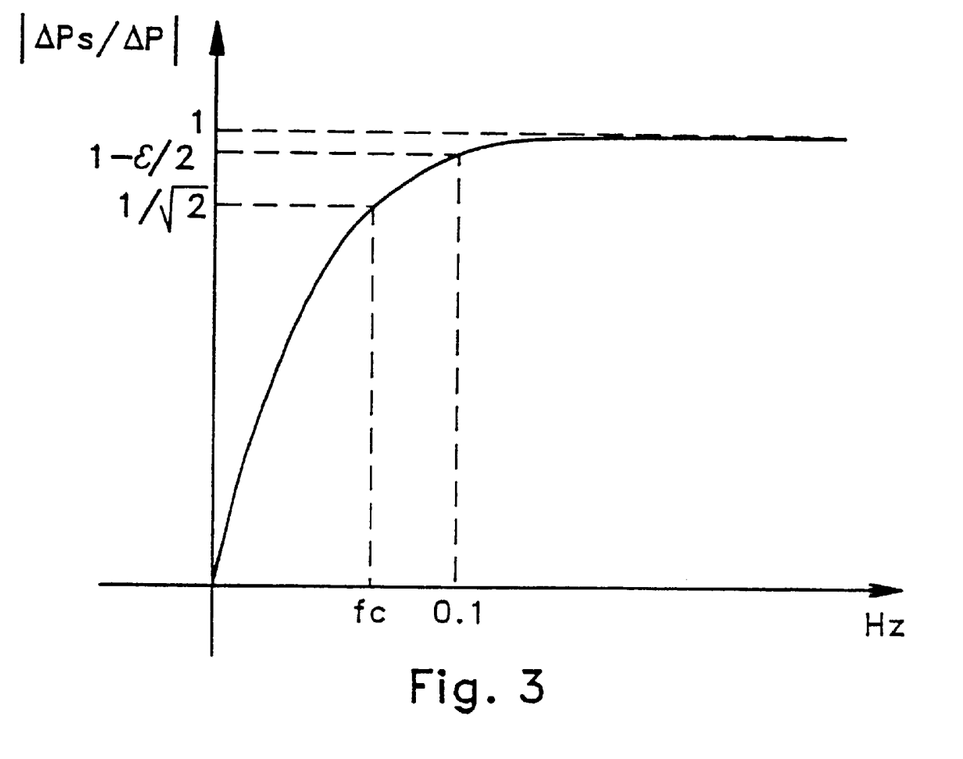
FIG. 3 is a graph in which the curve shows the frequency response of the fluidic filter constituted-by the membranes and by the passage formed between the two filters.

The function $\Delta P_s/\Delta P$ which represents the operation of the filter as a function of frequency has the appearance given by the curve in FIG. 3.

For example, the frequency at which the ratio $\Delta P_s/\Delta P$ is equal to 0.96 (i.e. to 1−4%), is determined by the dimensions of the passage 50, while taking account of two parameters: firstly the frequency of the oscillation signal associated with the minimum flow rate of fluid to be measured which the sensor 42 is required to detect without attenuation due to the filter, and secondly the frequencies of slow phenomena which cause parasitic differential pressures to appear on either side of the wall 36 in the chambers 38 and 40, and which it is desirable to attenuate as much as possible.

By way of example it may be desired to detect oscillation frequencies greater than 0.1 Hz while avoiding slow phenomena due to the environment setting up parasitic differential pressure between the chambers 38 and 40 at a frequency that is low (f<<0.1 Hz) or even 0, since that would deform the sensitive element of the sensor 42 which would give rise to disturbance in the metering of the fluid that has flowed through the fluidic oscillator. By way of example, such a phenomenon can occur when the volumes of the chambers 38 and 40 are not absolutely identical and when the measurement cell is subjected to a temperature rise of 25° C. relative to ambient temperature (20° C.) for a period of about 40 seconds (s) (i.e. a frequency of 0.025 Hz).

A passage 50 of suitable dimensions makes it possible to compensate for the parasitic differential pressure that results from the increase in temperature by bringing the pressures in the chambers 38 and 40 of the cell into equilibrium.

In this mode of operation of the cell, the ratio $\Delta P_s/\Delta P$ is much less than 1 (portion of the curve in FIG. 3 that is situated to the left of the frequency fc), the sensor is practically unaffected, and the pressure remains substantially in equilibrium on either side of the wall 36 throughout the duration of the slow disturbing phenomenon.

For phenomena that are not so slow (periods of the order of 10 s to 20 s) the ratio $\Delta P_s/\Delta P$ is closer to 1 than in the preceding case, so the sensor is indeed more affected by the appearance of this parasitic differential pressure.

Above 0.1 Hz, the sensor must be capable of detecting oscillatory signals, and as a result the passage 50 must no longer bring the pressures into equilibrium, but must ensure that the differential pressure variations are transmitted in full.

Figure 4:
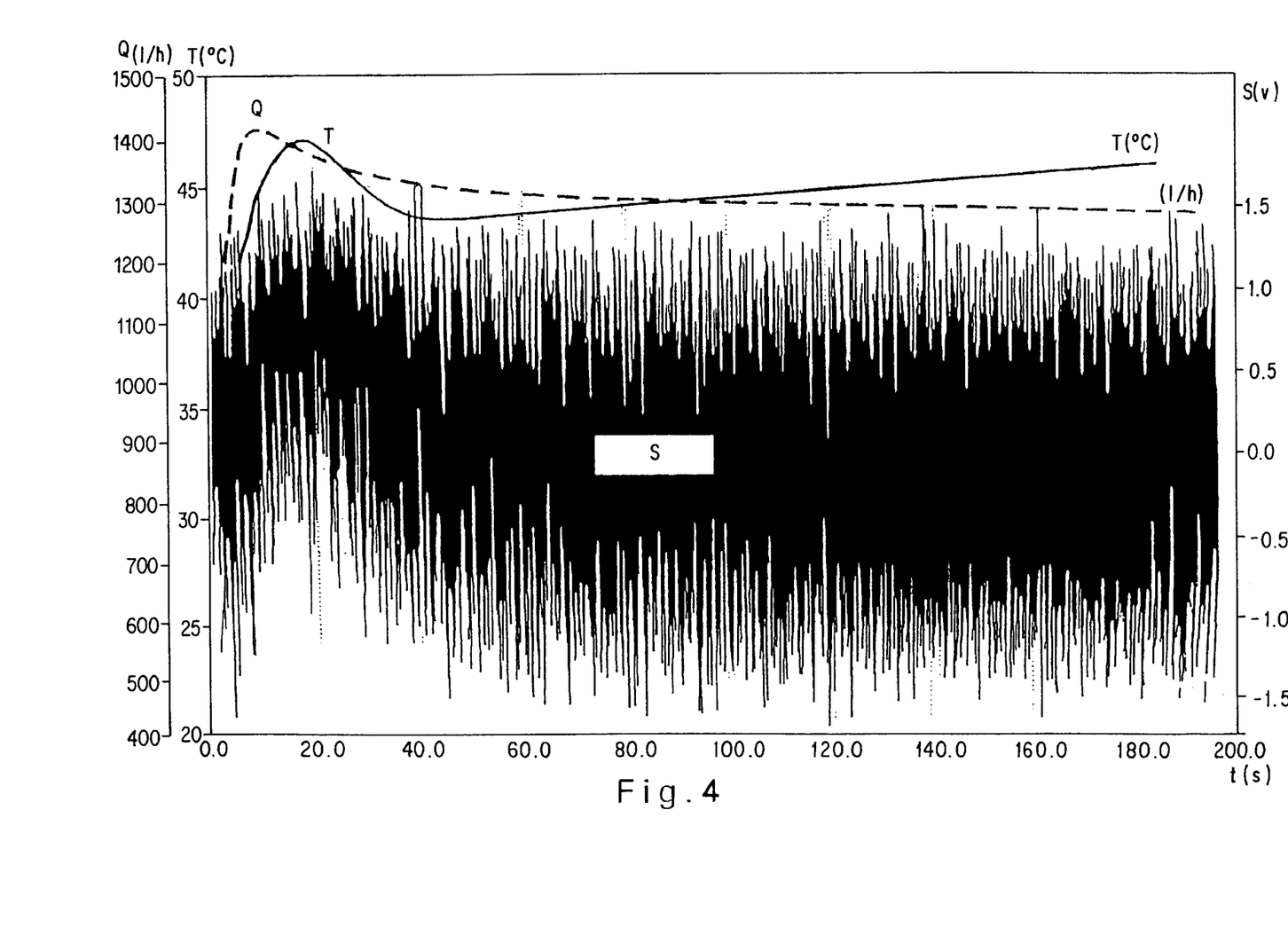
FIG. 4 is a single diagram showing simultaneously variation in a fluid flow rate Q through the fluidic oscillator of FIG. 1, a rise in the temperature T of the water in the feed duct connected to the fluidic oscillator, and the response S of the differential pressure converter cell shown in FIG. 2.

FIG. 4 is a single diagram showing simultaneously the variations in the flow rate Q through the fluidic oscillator of FIG. 1, a rise in the temperature T of the water in the feed pipe connected to the fluidic oscillator, and the response S of the differential pressure converter cell shown in FIG. 2.

When the temperature of the water goes from 20° C. to about 47.5° C. in less than 20 s, the mean signal S (black zone in FIG. 4) delivered by the converter cell of the invention is nonetheless affected by this temperature rise as is shown by the left-hand portion of the signal S at times less than 40 s.

In contrast, when temperature variations are much slower, FIG. 4 shows that the mean signal S stabilizes about the mean value 0 V and is therefore unaffected by said variations, thus showing the effectiveness of the invention. FIG. 4 also shows that the instantaneous signal S faithfully reproduces the high frequency oscillators (10 Hz to 40 Hz) which are representative of the flow rate that is to be measured.

Naturally, it is possible to dimension the passage 50 of FIG. 2 in such a manner that phenomena at a frequency of less than 0.1 Hz are attenuated to a greater extent than in the example described above. Nevertheless, under such circumstances, the measurement cell will also be less sensitive to flow signals at a low frequency of oscillation.

It is therefore necessary to establish a compromise between the lowest frequency of signals that need to be detected coming from the fluidic oscillator and acceptable levels of low frequency phenomena that give rise to parasitic pressure differences between the chambers 38 and 40.

To determine the appropriate dimensions for the passage 50, the procedure is as follows.

The flow rate Q of oil through the passage 50 is given by Poiseuille's formula which is written as follows:

$$Q = \Delta P_s \pi d^4/(128 L \eta)$$

where d corresponds to the diameter of the passage 50, L corresponds to the length of the opening 50, η corresponds to the dynamic viscosity of the oil, and $\Delta P_s$ is the pressure across the passage 50.

The membranes 32 and 34 are characterized by a coefficient K which is defined as the ratio of the pressure applied to the membrane over the volume displaced. This ratio K is written as follows:

$$K = \Delta P_m/\Delta V, \text{ and } \Delta P = 2\Delta P_m + \Delta P_s$$

For example, for a flat steel membrane, the ratio K can be equal to $0.11 \times 10^{12}$ Pa/m³.

The cutoff frequency is written:

$$fc = Kd^4/(128L\eta)$$

Given that the cutoff frequency fc is fixed by the predetermined value of 0.1 Hz which corresponds to the lowest frequency that must be detectable, and that the values of K and η are given, it is possible to determine values for L and d which satisfy the above formula.

Thus, for example, the diameter of the passage 50 can be 120 μm and its length L can be 1.6 mm, with the outside diameter of the cylinder 48 being equal to 4.5 mm, for example.

It should be observed that the length of the passage 50 of the glass cylinder 48 may lie, for example, in the range 1 mm to 2 mm, and that its diameter d may lie in the range 60 μm to 120 μm.

The glass cylinder may be obtained, for example, by cutting to appropriate dimensions a capillary tube that is sold in lengths of 1.60 meters (m), for example, by SCHOTT under the trade reference N16B.

In the example of FIG. 3, the numerical values are as follows:

diameter of the membranes: 21 mm;
thickness of the membranes: 50 μm;
volumes of the chambers 38 and 40: 210 mm$^3$ and 150 mm$^3$;
oil used: Dow Corning DC 200-5;
dynamic viscosity: 5 mm$^2$s$^{-1}$.

Advantageously, the passage 50 of appropriate dimensions makes it possible to mitigate differential change between the membranes 32 and 34 over the course of time, and also makes it possible to ignore any difference which may exist between the stiffness values of these membranes and which, by means of a rise in temperature, can give rise to a parasitic pressure difference between the chambers 38 and 40 even when the volumes of the chambers are exactly equal by construction.

Figure 5:
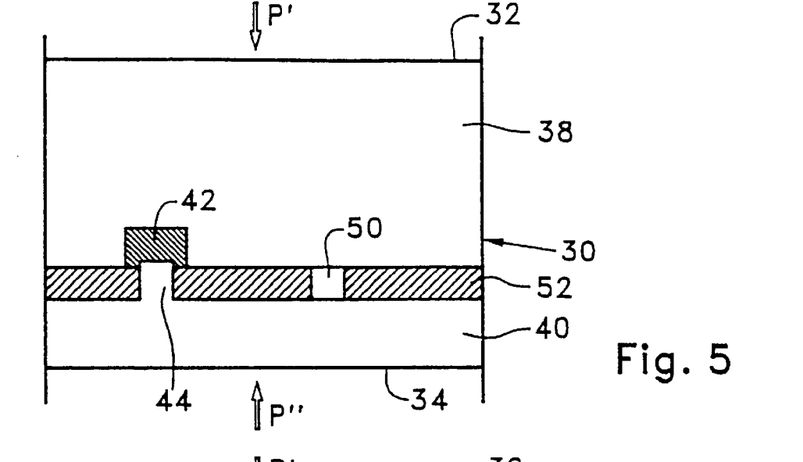
FIG. 5 is a diagrammatic section of a converter cell constituting an embodiment different from that of the cell shown in FIG. 2.

In another embodiment of the invention, the passage 50 of appropriate dimensions is formed through the separator wall 52 of the cell as shown in FIG. 5.

In a variant of the embodiment of the invention shown in FIG. 2, a plurality of passages 54 are formed through the piece 55 applied to the separator wall 36 of the cell (FIG. 6), the multiple passages performing a function analogous to that of the passage 50 shown in FIG. 2.

Figure 6:
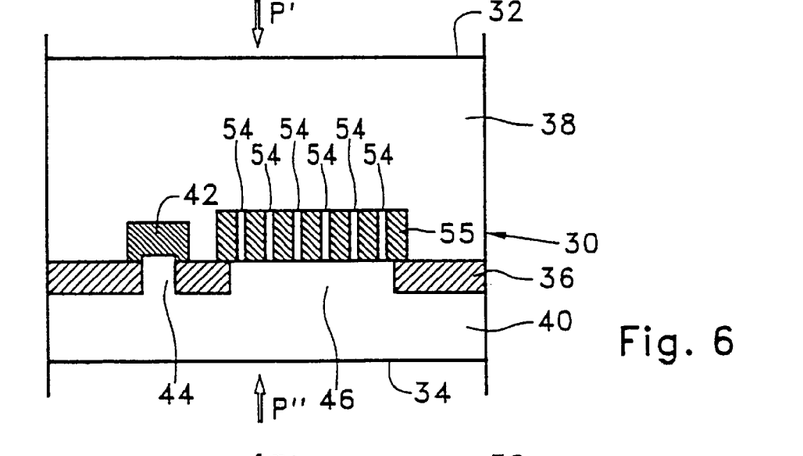
FIG. 6 is a diagrammatic section view of another converter cell constituting a variant of the cell shown in FIG. 2.

These passages are dimensioned by continuing to use the above-mentioned electrical analogy and by treating the passages 54 as a plurality of resistors connected in parallel.

Figure 7:
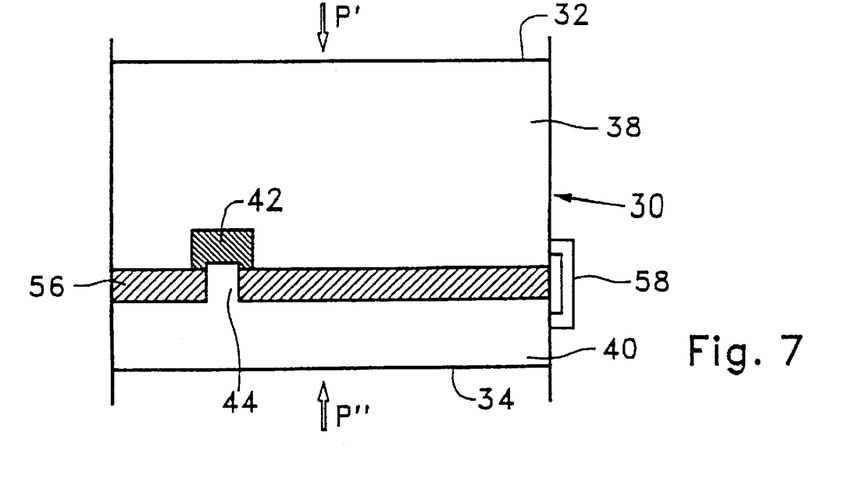
FIG. 7 is a diagrammatic section view of a converter cell constituting yet another embodiment of the invention.

In another embodiment, shown in FIG. 7, the separator wall 56 has only one orifice 44 in register with the sensor 42.

The appropriate passage between the chambers 38 and 40 is implemented in the form of a communication channel 58 disposed on the peripheral wall 30 of the measurement cell so as to bypass the separator wall 56, with opposite ends thereof 58a and 58b opening out into respective ones of said chambers 38 and 40.

By way of example, the channel is implemented as a fine capillary tube.

The function of the channel is analogous to that of the passage 50 of FIG. 2 and its dimensions are determined in similar manner.

It should be observed that the passage providing communication between the chambers 38 and 40 may also be formed directly in the differential pressure sensor, for example in the form of a channel passing through the walls of the sensor at a distance from the zone in which the sensitive element is situated.

What is claimed is:

1. A cell for converting a differential pressure into an electric signal, the cell comprising:
    two chambers filled with an incompressible fluid and each closed by a respective membrane suitable for deforming under the action of an external pressure, the chambers being separated from each other by a rigid wall; and
    a sensor associated with said wall and responsive to the pressure difference exerted across the wall, delivering an electric signal in response thereto;
    wherein at least one passage is formed between the two chambers and having dimensions in order to firstly at least attenuate a parasitic pressure difference existing across the wall at a frequency that is low or zero, and secondly allow said sensor to detect the pressure difference exerted across the wall at higher frequencies.

2. A measurement cell according to claim 1, in which the at least one passage of appropriate dimensions is formed in the wall separating the chambers.

3. A measurement cell according to claim 1, in which an opening is formed through the wall separating the chambers and having dimensions that are large relative to the dimensions appropriate for the at least one passage and said at least one passage is formed in an add-on piece applied to said separator wall so that the at least one passage and the opening are in communication with each other.

4. A measurement cell according to claim 3, in which the add-on piece is substantially cylindrical in shape.

5. A measurement cell according to claim 1, in which the at least one passage of appropriate dimensions is implemented in the form of a communication channel bypassing the chamber separator wall.

* * * * *

UNITED STATES PATENT AND TRADEMARK OFFICE
CERTIFICATE OF CORRECTION

PATENT NO. : 6,173,617 B2
DATED : March 30, 2004
INVENTOR(S) : Minoprio et al.

It is certified that error appears in the above-identified patent and that said Letters Patent is hereby corrected as shown below:

<u>Title page,</u>
Item [75], Inventors, "Rul Mario Dores Arala-Chavez" should read -- Rui Mario Dores Arala-Chavez --.

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,173,617 B2
DATED         : January 16, 2001
INVENTOR(S)   : Alan Zarudiansky It is certified that error appears in the above-identified patent and that said Letters Patent is hereby corrected as shown below:

This certificate supersedes Certificate of Correction issued May 18, 2004, the number was erroneously mentioned and should be vacated since no Certificate of Correction was granted.

Signed and Sealed this

Twenty-ninth Day of June, 2004

JON W. DUDAS
*Acting Director of the United States Patent and Trademark Office*